United States Patent
Park et al.

(10) Patent No.: US 9,260,053 B2
(45) Date of Patent: Feb. 16, 2016

(54) AUTOMOTIVE HEADLAMP SYSTEM AND METHOD OF CONTROLLING THE SAME

(75) Inventors: Jong Ryoul Park, Gyeongsan (KR); Sung Ho Kim, Gyeongsan (KR)

(73) Assignee: SL Corporation, Daegu (KR)

( * ) Notice: Subject to any disclaimer, the term of this patent is extended or adjusted under 35 U.S.C. 154(b) by 823 days.

(21) Appl. No.: 13/478,618

(22) Filed: May 23, 2012

(65) Prior Publication Data

US 2012/0299478 A1 Nov. 29, 2012

(30) Foreign Application Priority Data

May 23, 2011 (KR) .................. 10-2011-0048550

(51) Int. Cl.
| B60Q 1/02 | (2006.01) |
| B60Q 7/00 | (2006.01) |
| B60Q 1/14 | (2006.01) |
| F21S 8/10 | (2006.01) |

(52) U.S. Cl.
CPC ............. *B60Q 1/143* (2013.01); *F21S 48/1747* (2013.01); *B60Q 2300/054* (2013.01); *B60Q 2300/056* (2013.01); *B60Q 2300/42* (2013.01)

(58) Field of Classification Search
USPC ...................................................... 315/76–84
See application file for complete search history.

(56) References Cited

U.S. PATENT DOCUMENTS

| 6,928,180 | B2 * | 8/2005 | Stam et al. ..................... 382/104 |
| 2003/0107323 | A1 * | 6/2003 | Stam ............................... 315/82 |
| 2007/0108843 | A1 * | 5/2007 | Preston et al. ................. 307/112 |
| 2009/0190323 | A1 | 7/2009 | Watanabe et al. |
| 2009/0279317 | A1 * | 11/2009 | Tatara ........................... 362/465 |
| 2009/0315479 | A1 * | 12/2009 | Hayakawa ..................... 315/294 |
| 2010/0052550 | A1 * | 3/2010 | Kobayashi ..................... 315/158 |
| 2010/0134011 | A1 * | 6/2010 | Kobayashi ....................... 315/82 |
| 2010/0194276 | A1 * | 8/2010 | Okubo et al. ................... 315/82 |
| 2011/0012511 | A1 * | 1/2011 | Watanabe ........................ 315/82 |

(Continued)

FOREIGN PATENT DOCUMENTS

| DE | 10 2011 077636 A1 | 11/2011 |
| EP | 2 103 868 A2 | 9/2009 |

(Continued)

OTHER PUBLICATIONS

European Search Report for European Application No. 12 00 5243, dated Sep. 16, 2013.

*Primary Examiner* — Brandon S Cole

(74) *Attorney, Agent, or Firm* — Mintz Levin Cohn Ferris Glovsky and Popeo, P.C.; Kongsik Kim; Colleen H. Witherell

(57) ABSTRACT

Disclosed is an automotive headlamp system which can control an illumination pattern of headlamps by rotating a headlamp unit and/or adjusting the light intensity of a light source included in the headlamp unit based on the position of a front vehicle located ahead in a driving direction, and a method of controlling the automotive headlamp system. The automotive headlamp system includes an image capture unit capturing an image of an area ahead of a vehicle in a driving direction of the vehicle, a position determination unit determining a position of a front vehicle based on the captured image, a headlamp unit comprising an array of a plurality of light sources, and a control unit controlling an illumination pattern of the headlamp unit by rotating the headlamp unit and/or adjusting a light intensity of a light source based on the determined position of the front vehicle.

21 Claims, 16 Drawing Sheets

(56) References Cited

U.S. PATENT DOCUMENTS

| | | | | |
|---|---|---|---|---|
| 2012/0206050 A1* | 8/2012 | Spero | | 315/152 |
| 2013/0169154 A1* | 7/2013 | Kay et al. | | 315/81 |

FOREIGN PATENT DOCUMENTS

| | | |
|---|---|---|
| EP | 2 196 727 A1 | 6/2010 |
| EP | 2 281 719 A1 | 2/2011 |
| JP | 07-101291 A | 4/1995 |
| JP | 2001-213227 A | 8/2001 |
| JP | 2007-227088 A | 9/2007 |
| JP | 2009-227088 A | 10/2009 |
| JP | 2010-132170 A | 6/2010 |
| KR | 20-0282037 | 7/2002 |
| KR | 20-2011-0006481 | 6/2011 |
| KR | 10-2011-0084786 | 7/2011 |
| WO | 2009-039882 A1 | 4/2009 |
| WO | 2010/092795 A1 | 8/2010 |
| WO | 2013-075157 A1 | 5/2013 |

* cited by examiner

RIGHT HEADLAMP

LEFT HEADLAMP  RIGHT HEADLAMP

AUTOMOTIVE HEADLAMP SYSTEM AND METHOD OF CONTROLLING THE SAME

CROSS-REFERENCE TO RELATED APPLICATION

This application claims priority from Korean Patent Application No. 10-2011-0048550 filed on May 23, 2011 in the Korean Intellectual Property Office, the disclosure of which is incorporated herein by reference in its entirety.

BACKGROUND

1. Field of the Invention

The present invention relates to an automotive headlamp system and a method of controlling the same, and more particularly, to an automotive headlamp system which can control an illumination pattern by rotating a headlamp unit and/or adjusting the light intensity of a light source included in the headlamp unit based on the position of a front vehicle located ahead in a driving direction, and a method of controlling the automotive headlamp system.

2. Description of the Related Art

Vehicles are equipped with automotive lamps that in the most basic configuration have a lighting function and a signaling function, among others. Automotive lamps enable the driver of the vehicle to easily see objects around and ahead of the vehicle while driving at night or in a dark area. They also notify other vehicles and road users of the vehicle's location in the dark. For example, a headlamp and a fog lamp are designed for the lighting function, and a direction indicator, a taillight, a brake light, and a side marker are designed for the signaling function.

When a driver is driving a vehicle at night or through a dimly lit tunnel, light emitted from light sources used in headlamps or tail lamps of the vehicle enables the driver to see the area ahead of and behind the vehicle. Thus, the light ensures safe driving. Here, an automotive lamp includes an optical functional body and a plurality of reflective surfaces in order to properly disperse light emitted from light sources or polarize or concentrate refracted light to the front.

Recently, there have been increasing demands for safety to ensure safer driving environments for the driver and others on the road. For example, when a vehicle is being driven at night, the headlamps may dazzle the driver of a preceding or oncoming vehicle located ahead of the vehicle in the driving direction, thereby obstructing the driver's view in the preceding or oncoming vehicle. Accordingly, this can increase the likelihood of car accidents. Thus, there is a need for a solution that can ensure the visibility of the driver of the vehicle without obstructing the view of drivers in preceding or oncoming vehicles.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Aspects of the present invention provide an automotive headlamp system which can determine the position of a front vehicle located ahead of a vehicle in a driving direction and control an illumination pattern by rotating a headlamp unit, which includes an array of a plurality of light sources, and/or adjusting a light intensity of a light source of the headlamp unit based on the determined position of the front vehicle.

Aspects of the present invention also provide an automotive headlamp system which can form an optimum illumination pattern by rotating a headlamp unit when an illumination pattern is controlled by adjusting light intensities of light sources of the headlamp unit.

Aspects of the present invention also provide an automotive headlamp system which can compensate for a shadow zone which is formed by the rotation of a headlamp unit and does not interfere with the visibility of a front vehicle located ahead in a driving direction.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an automotive headlamp system including an image capture unit configured to capture an image of an area ahead of a vehicle in a driving direction of the vehicle, a position determination unit configured to determine a position of a front vehicle based on the captured image, a headlamp unit comprising an array of a plurality of light sources, and a control unit configured to control an illumination pattern of the headlamp unit by rotating the headlamp unit and/or adjusting a light intensity of a light source based on the determined position of the front vehicle.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE DISCLOSURE

Figure 1:
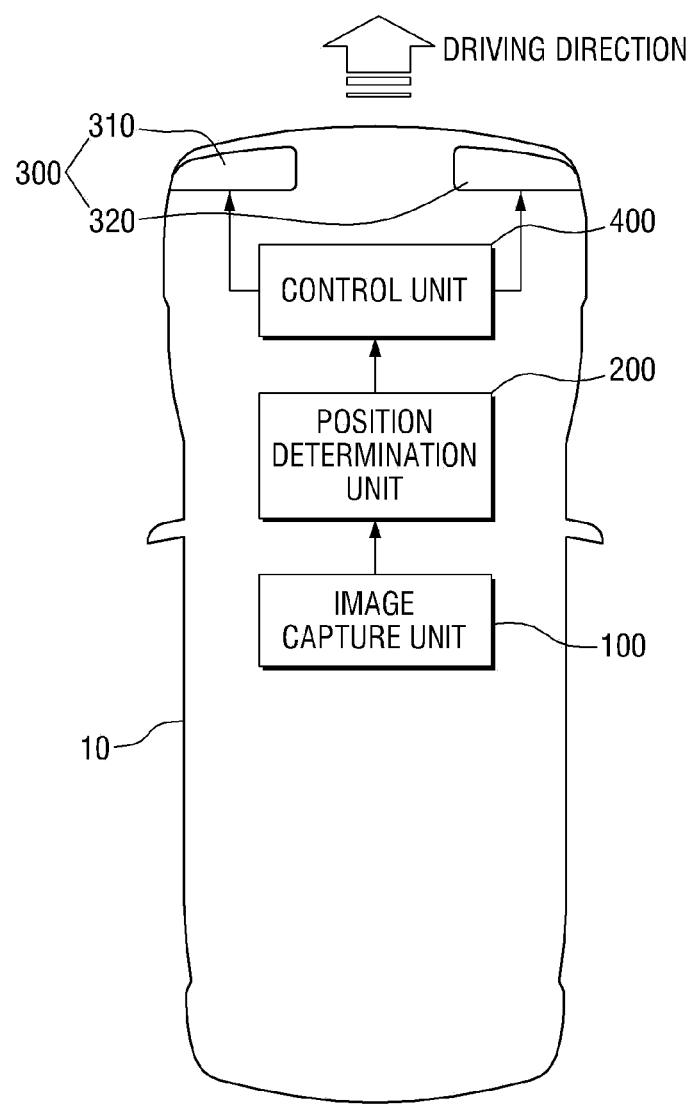
FIG. 1 is a schematic diagram of an automotive headlamp system according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In some embodiments, well-known processing processes, well-known structures and well-known technologies will not be specifically described in order to avoid ambiguous interpretation of the present invention.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof. As used herein, the term "and/or" includes any and all combinations of one or more of the associated listed items.

Embodiments of the invention are described herein with reference to cross-section and/or schematic illustrations that are illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In addition, each component shown in figures of the present invention may have been enlarged or reduced for ease of description.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, an automotive headlamp system and a method of controlling the same according to embodiments of the present invention will be described with reference to the attached drawings.

FIG. 1 is a schematic diagram of an automotive headlamp system 1 according to an embodiment of the present invention. Referring to FIG. 1, the automotive headlamp system 1 according to the exemplary embodiment may include an image capture unit 100 which captures an image of an area ahead of a vehicle 10 in a driving direction of the vehicle 10, a position determination unit 200 which determines the position of a preceding or oncoming vehicle based on the captured image, a headlamp unit 300 which includes an array of a plurality of light sources, and a control unit 400 which controls an illumination pattern of the headlamp unit 300 by rotating the headlamp unit 300 and/or adjusting the light intensity of a light source based on the determined position of the preceding or oncoming vehicle. In the illustrative embodiments of the present invention, an oncoming or preceding vehicle will be referred to as a "front vehicle."

The image capture unit 100 may include a camera module (not shown) which is installed at a predetermined position on the vehicle 10 and captures an image of an area ahead of the vehicle 10 in the driving direction. The image capture unit 100 may transmit the captured image to the position determination unit 200. The image capture unit 100 may be installed on the front of the vehicle 10 or on an inside mirror. However, this is merely an example used to help understand the present invention, and the present invention is not limited to this example. The installation position of the image capture unit 100 may vary according to the model or use of the vehicle 10 and as necessary. Also, the image capture unit 100 may include a camera module for capturing an image of an area behind the vehicle 10 or an area on a side of the vehicle 10, in addition to the camera module for capturing an image of an area ahead of the vehicle 10.

For ease of data transmission, the camera module of the image capture unit 100 may convert a captured image into a compression format before transmitting the captured image. Various conventional formats such as MPEG-1 and MPEG-4 can be used as the compression format, however, the illustrative embodiment of the present invention is not limited thereto. The image capture unit 100 may include a processor for converting the format of data.

The position determination unit 200 may determine the position of a front vehicle based on an image captured by the image capture unit 100. The position determination unit 200 may distinguish a preceding vehicle from an oncoming vehicle based on an optical wavelength difference between headlamps and tail lamps or based on the position of a centerline shown in the captured image. Here, the captured image may contain light emitted not only from the headlamps or the tail lamps but also from other light sources such as streetlamps, signs, etc. Therefore, the position determination unit 200 may recognize light existing inside right and left boundary points of the road as a vehicle or recognize only a pair of similar intensities of illumination and a pair of similar light distribution patterns as headlamps or tail lamps. These methods used by the position determination unit 200 to determine the position of a front vehicle, however, are mere examples used to help understand the present invention, and various conventional methods can also be used in addition to the above methods.

As stated above, high beams can widen the field of view of a driver of the vehicle 10 during nighttime driving. On the other hand, high beams can dazzle a driver of a front vehicle, thereby obstructing the driver's view. This increases the probability of car accidents. Therefore, the position determination unit 200 determines the position of a front vehicle in order to appropriately control the high beams according to the position of the front vehicle. In the illustrative embodiment, the position determination unit 200 determines the position of a front vehicle based on an image provided by the image capture unit 100 and automatically controls the high beams without manipulation by the driver. Thus, the high beams are dynamically switched from high to low beams upon detection of a front vehicle.

That is, the position determination unit 200 ensures safe driving by automatically controlling the high beams without manipulation by the driver when the vehicle 10 is being driven with the high beams on, controlling the high beams to not obstruct the view of a driver of a front vehicle, and while at the same time controlling the high beams to secure maximum visibility for the driver of the vehicle 10 when high beams can be safely utilized.

The present invention protects the visibility of a driver of a front vehicle and ensures maximum visibility for the driver of the vehicle 10 by rotating the headlamp unit 300 which includes an array of a plurality of light sources and/or adjusting the light intensity of a light source. This will be described in detail later.

The headlamp unit 300 may include a first headlamp 310 and a second headlamp 320. In the illustrative embodiment, the first headlamp 310 is a left headlamp installed on a front left side of the vehicle 10 and the second headlamp 320 is a right headlamp installed on a front right side of the vehicle 10 and will be described as an exemplary embodiment. In embodiments of the present invention, the first headlamp 310 will be referred to as a left headlamp, and the first headlamp 320 will be referred to as a right headlamp. In addition, a case where the headlamp unit 300 according to the illustrative embodiment illuminates the high beams will be described as an example. Low beams can be realized using technologies such as a conventional adaptive headlamp system. A case where an appropriate pattern of low beams is illuminated according to road conditions (such as the ambient brightness of the road or weather conditions) during night driving will be described as an example as well.

Figure 2:
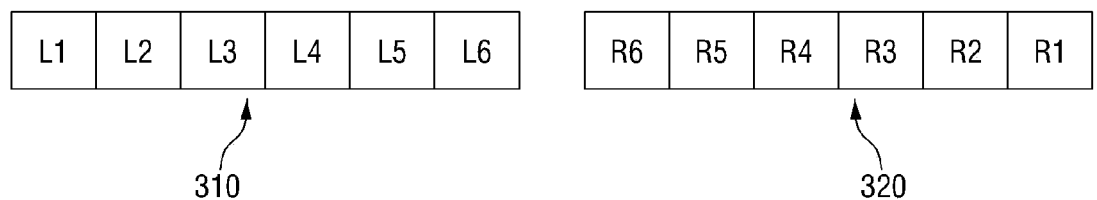
FIG. 2 is a schematic diagram of a left headlamp and a right headlamp shown in FIG. 1.

FIG. 2 is a schematic diagram of the left headlamp 310 and the right headlamp 320 shown in FIG. 1. Referring to FIG. 2, each of the left headlamp 310 and the right headlamp 320 may include an array of a plurality of light sources. A plurality of light sources are arranged in a direction from the outside of the vehicle 10 toward the inside thereof in the order of L1 to L6 and R1 to R6.

In the illustrative embodiment, each of the left headlamp 310 and the right headlamp 320 includes an array of six light sources. However, this is merely an example used to help understand the present invention, and the present invention is not limited to this example. The number of light sources can be increased or reduced according to the vehicle model or the road conditions. In the illustrative embodiment, the light sources are light-emitting diodes (LEDs). However, the LEDs are merely an example used to help understand the present invention, and the present invention is not limited thereto.

Figure 3:
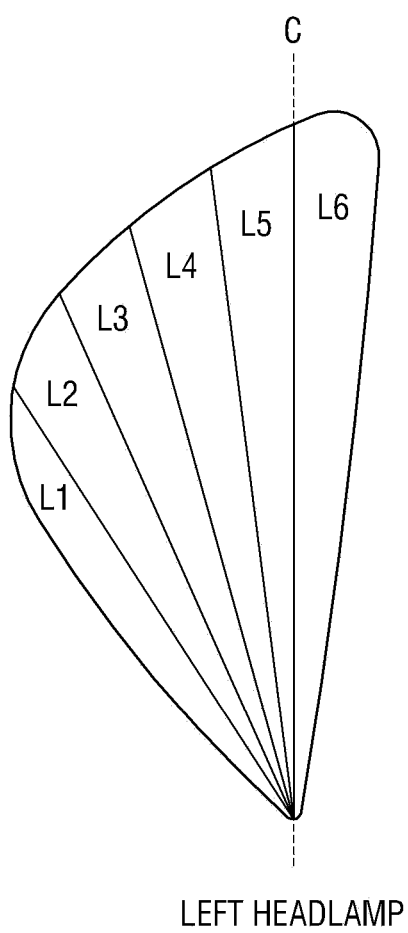
FIG. 3 is a schematic diagram of an illumination pattern of the left headlamp according to an exemplary embodiment of the present invention.
Figure 4:
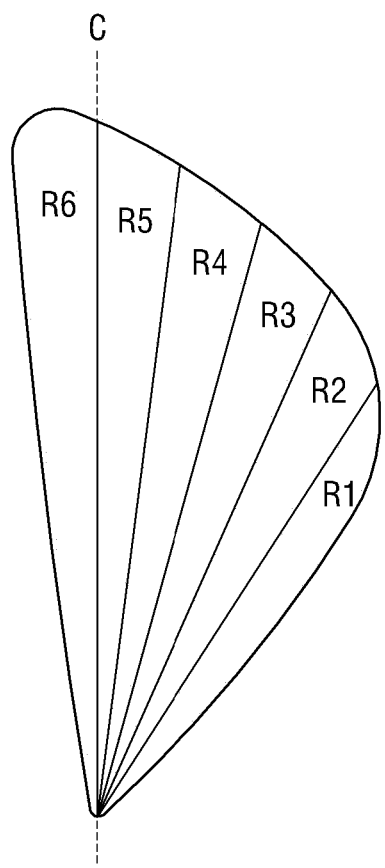
FIG. 4 is a schematic diagram of an illumination pattern of the right headlamp according to an exemplary embodiment of the present invention.

FIGS. 3 and 4 are schematic diagrams of illumination patterns of the left headlamp 310 and the right headlamp 320 according to an exemplary embodiment of the present invention.

Referring to FIG. 3, respective illumination patterns of the light sources L1 through L6 included in the left headlamp 310 may combine to form an illumination pattern of the left headlamp 310.

Similarly, referring to FIG. 4, respective illumination patterns of the light sources R1 through R6 included in the right headlamp 320 may combine to form an illumination pattern of the right headlamp 320. In FIGS. 3 and 4, reference character 'C' can be understood as a centerline of the vehicle 10.

Figure 5:
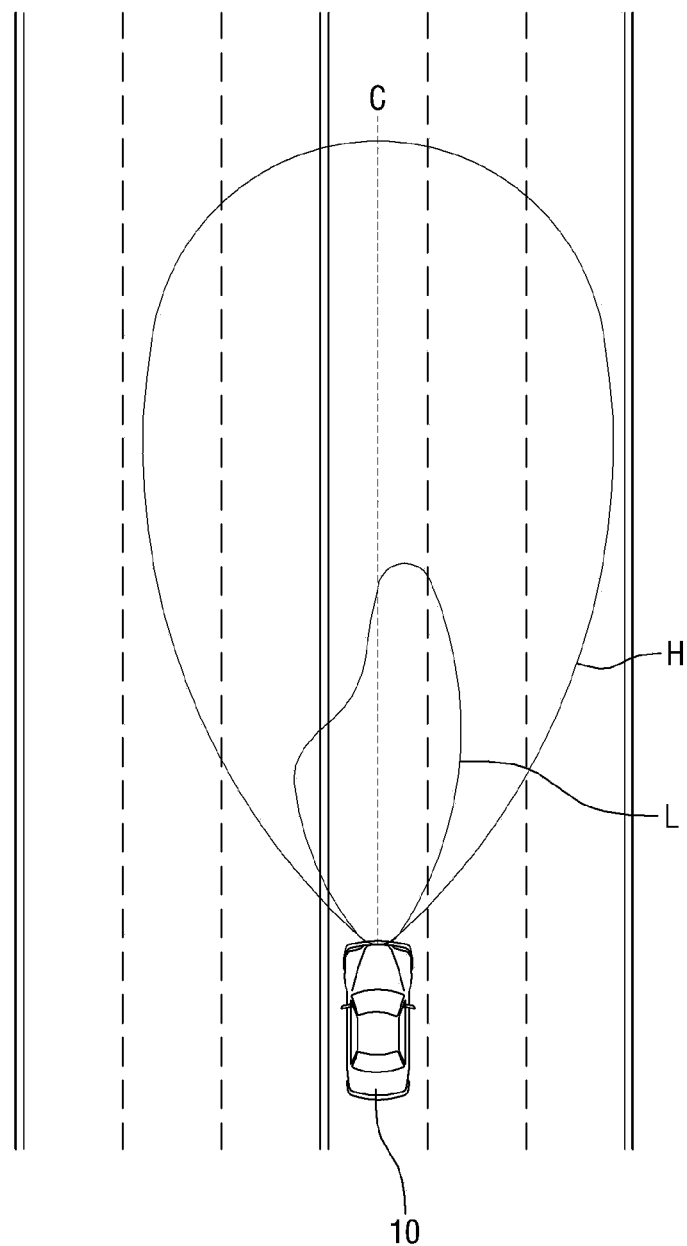
FIG. 5 is a schematic diagram of illumination patterns of high and low beams according to an exemplary embodiment of the present invention.

The illumination patterns of the left headlamp 310 and the right headlamp 320 shown in FIGS. 3 and 4 may form an illumination pattern H corresponding to the high beams of the vehicle 10 as shown in FIG. 5. In FIG. 5, reference character 'L' can be understood as an illumination pattern corresponding to the low beams of the vehicle 10. In addition, the illumination pattern H corresponding to the high beams can be understood as an illumination pattern formed when there is no front vehicle ahead of the vehicle 10 in the driving direction.

For simplicity, a description of the illumination pattern L corresponding to the low beams will be omitted. However, it is assumed that the low beams are being illuminated in an appropriate illumination pattern in addition to the high beams being illuminated in the illumination pattern H.

The control unit 400 may control an illumination pattern by rotating the headlamp unit 300 or adjusting the light intensity of a light source included in the headlamp unit 300 based on the position of a front vehicle determined by the position determination unit 200. The light source whose light intensity is adjusted may be determined by the position of the front vehicle.

That is, to protect the visibility of a driver of a front vehicle, the control unit 400 may form a shadow zone by rotating the headlamp unit 300 and/or adjusting the light intensity of a light source. In the illustrative embodiment, the control unit 400 may adjust the light intensity of the light source by reducing the light intensity of the light source or turning off the light source.

When a front vehicle is located within a predetermined angular range with respect to the centerline C of the vehicle 10, the control unit 400 may form a shadow zone by rotating the headlamp unit 300. When the front vehicle is located outside the predetermined angular range, the control unit 400 may form the shadow zone by adjusting the light intensity of a light source corresponding to the position of the front vehicle.

In the illustrative embodiment, the control unit 400 forms a shadow zone by rotating the headlamp unit 300 when a front vehicle is within a predetermined angular range with respect to the centerline C of the vehicle 10 and forms the shadow zone by adjusting the light intensity of a light source in other cases. However, a combination of the two methods can also be used in some cases. This will be described in detail later.

Further, in the illustrative embodiment, the control unit 400 forms a shadow zone by rotating the headlamp unit 300 when a front vehicle exists within a predetermined angular range with respect to the centerline C of the vehicle 10. However, this is merely an example used to help understand the present invention, and the present invention is not limited to this example. That is, the angular range can be determined based on a line other than the centerline C.

Figure 6:
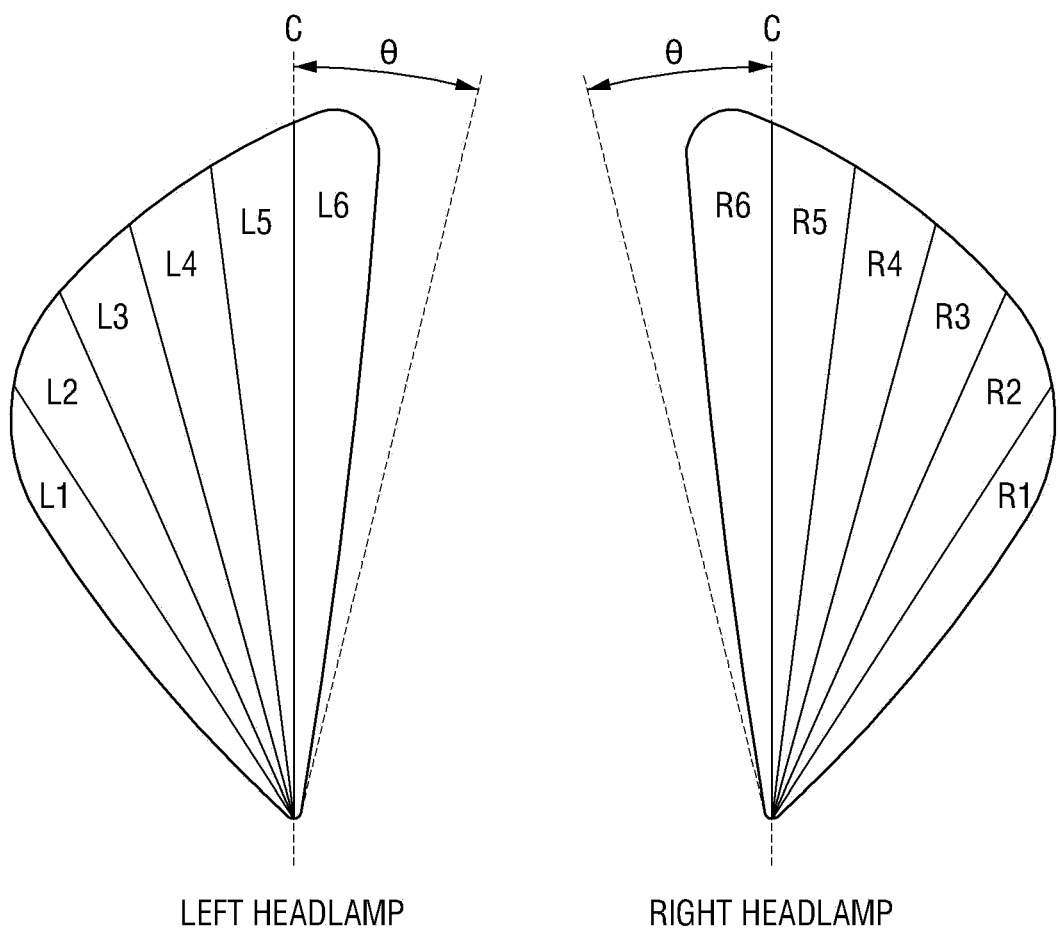
FIG. 6 is a schematic diagram of rotatable ranges of the left headlamp and the right headlamp according to an exemplary embodiment of the present invention.

FIG. 6 is a schematic diagram of rotatable ranges of the left headlamp 310 and the right headlamp 320 according to an embodiment of the present invention. Referring to FIG. 6, the left headlamp 310 and the right headlamp 320 according to the illustrative embodiment can rotate within a predetermined rotatable range θ with respect to the centerline C of the vehicle 10. Here, the rotatable range can vary according to road conditions or the vehicle model.

In FIG. 6, the rotatable range θ of the left headlamp 310 is equal to that of the right headlamp 320. However, this is merely an example used to help understand the present invention, and the present invention is not limited to this example. That is, the rotatable range θ of the left headlamp 310 can also be different from that of the right headlamp 320. In addition, a rotation angle of the left headlamp 310 may be equal to or different from that of the right headlamp 320. Any one or both of the left headlamp 310 and the right headlamp 320 may rotate according to the position of a front vehicle. For example, if the front vehicle is an oncoming vehicle, the left headlamp 310 alone may rotate. If the front vehicle is a preceding vehicle, the right headlamp 320 alone may rotate. In some cases, both of the left headlamp 310 and the right headlamp 320 may rotate when the front vehicle is an oncoming or preceding vehicle.

Figure 7:
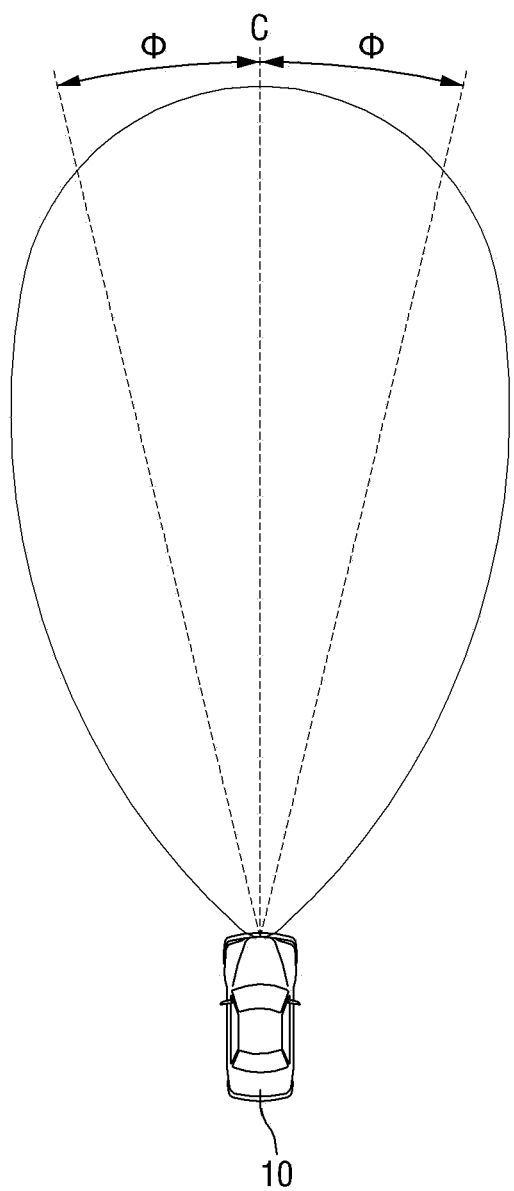
FIG. 7 is a schematic diagram of the range of an illumination pattern which can be controlled by rotating a headlamp unit according to an exemplary embodiment of the present invention.
Figure 8:
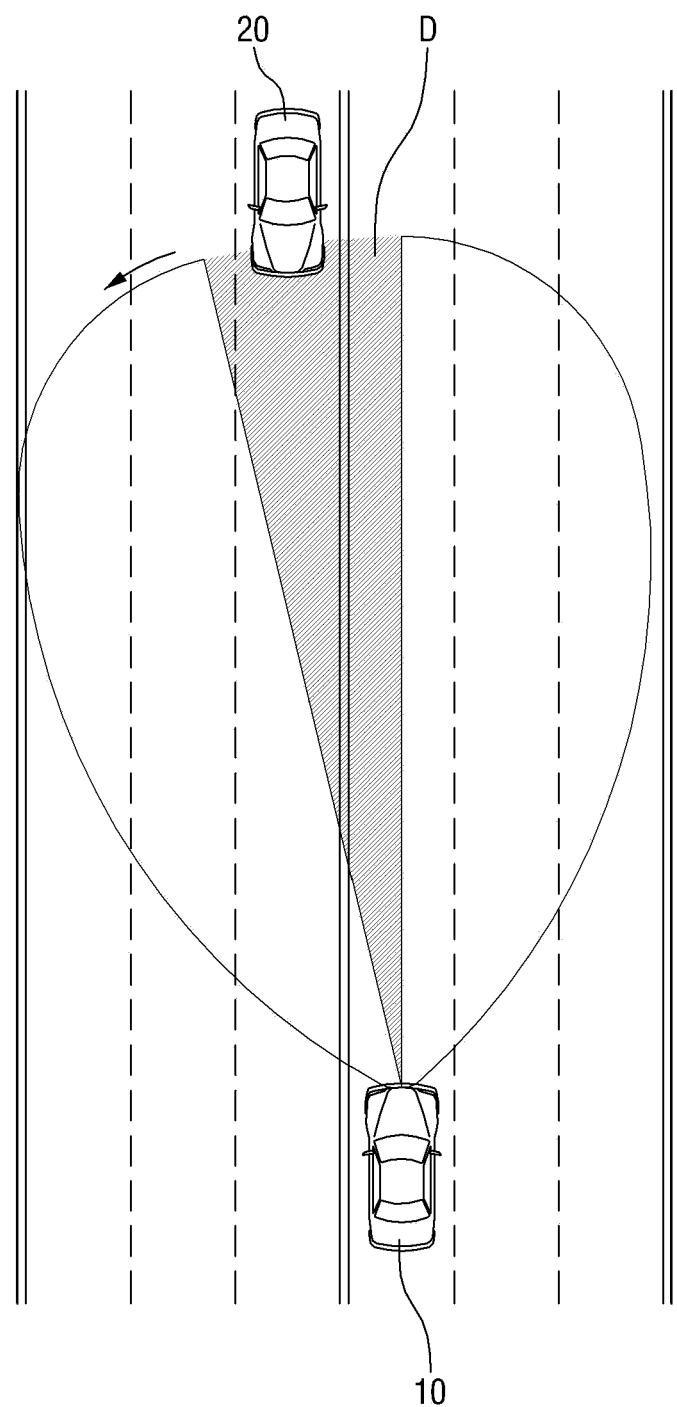
FIG. 8 is a schematic diagram of a shadow zone formed by rotating the headlamp unit according to an exemplary embodiment of the present invention.

A shadow zone formed by rotating the left headlamp 310 and the right headlamp 320 within the rotatable range θ of FIG. 6 may be as shown in FIGS. 7 and 8.

Referring to FIG. 7, when a front vehicle exists in a predetermined angular range Φ with respect to the centerline C of the vehicle 10 in both directions from the centerline C, a shadow zone may be formed by rotating one or more of the left headlamp 310 and the right headlamp 320. In FIG. 7, the same angular range Φ is set with respect to the centerline C for both directions from the centerline C. However, this is merely an example used to help understand the present invention, and the present invention is not limited to this example. Different angular ranges can also be set with respect to the centerline C for both directions from the centerline C.

As described above with reference to FIG. 7, a predetermined angular range Φ may be set for both directions from the centerline C. In this case, if a front vehicle 20 exists within the predetermined angular range Φ, a shadow zone D may be formed for the front vehicle 20 by rotating the left headlamp 310 within the rotatable range θ in a direction indicated by an arrow as shown in FIG. 8. In FIG. 8, the left headlamp 310 alone is rotated. However, this is merely an example used to help understand the present invention, and the present invention is not limited to this example. The shadow zone D can be formed by rotating one or more of the left headlamp 310 and the right headlamp 320 according to the position of the front vehicle 20.

When multiple front vehicles exist within the predetermined angular range Φ, the shadow zone D may be formed by rotating one or more of the left headlamp 310 and the right headlamp 320 based on the position of a leftmost front vehicle and the position of a rightmost front vehicle.

When the front vehicle 20 is outside the predetermined angular range Φ, the shadow zone D may be formed by reducing the light intensity of a light source corresponding to the position of the front vehicle 20 or turning off the light source.

Figure 9:
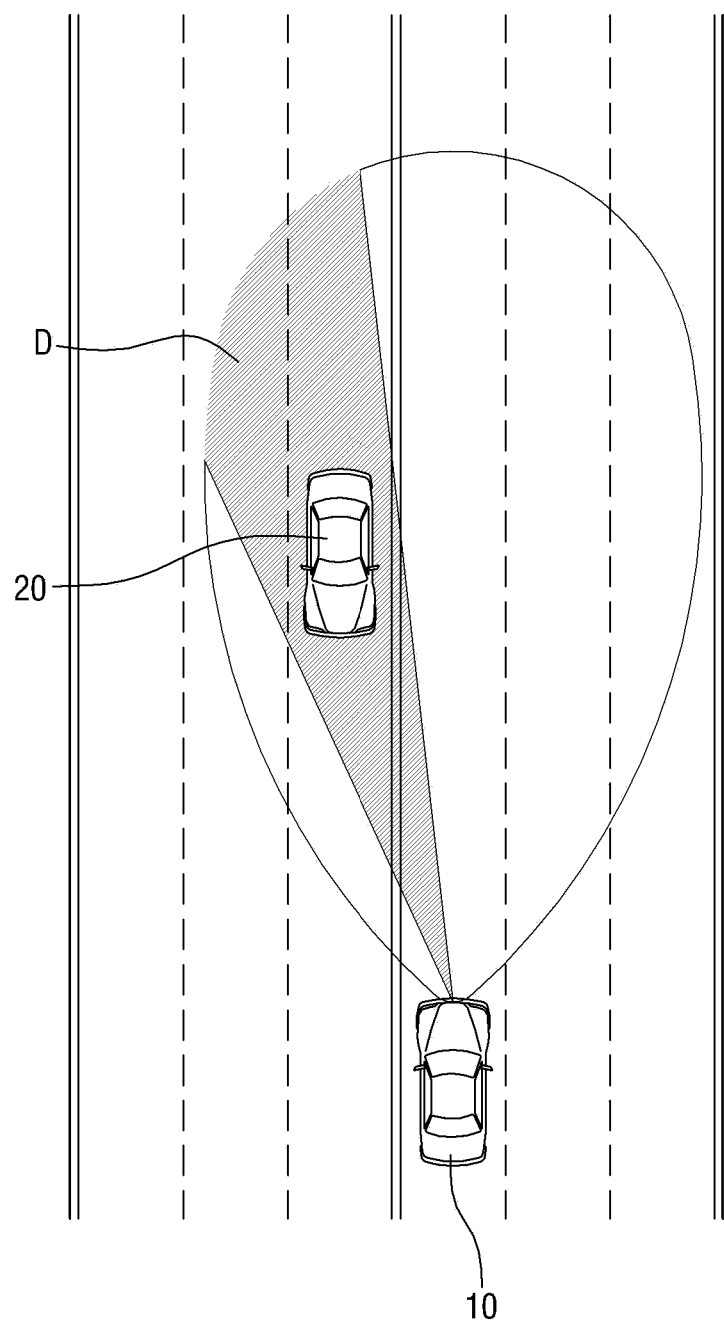
FIG. 9 is a schematic diagram of a shadow zone formed by adjusting the light intensity of a light source included in the headlamp unit according to an exemplary embodiment of the present invention.

For example, referring to FIG. 9, when the front vehicle 20 is outside the predetermined angular range Φ, the shadow zone D may be formed by adjusting the light intensity of a light source corresponding to the position of the front vehicle 20 (e.g., by reducing the light intensity of the light source or turning off the light source).

In FIG. 9, a case where there is only one front vehicle and where the front vehicle is an oncoming vehicle is described as an example. However, the present invention is not limited to this example. The present invention can be applied similarly to a case where there are multiple front vehicles. For example, when there is only one front vehicle and a light source corresponding to the position of the front vehicle is L5, the shadow zone D may be formed by adjusting the light intensity of the light source L5. When there are multiple front vehicles and light sources corresponding to the positions of the front vehicles are L5, R6 and R4, the shadow zone D may be formed by adjusting the light intensities of the light sources L5, L6, R6, R5 and R4 based on the position of a leftmost front vehicle and the position of a rightmost front vehicle.

As described above, the shadow zone D can be formed by adjusting the light intensity of a light source or rotating the headlamp unit 300. Therefore, no light source for forming a shadow zone is required where the shadow zone can be formed by rotating the headlamp unit 300. Accordingly, this can reduce the number of parts required, simplify the configuration of the headlamp unit 300, and save costs.

In other words, in the illustrative embodiment, when a front vehicle exists within the predetermined angular range Φ with respect to the centerline C of the vehicle 10, a shadow zone is formed by rotating the headlamp unit 300. Therefore, it is not necessary to reduce the light intensity of a light source for forming the shadow zone or turn off the light source when the front vehicle exists within the predetermined angular range Φ with respect to the centerline C. Thus, the light source is unnecessary.

After the control unit 400 forms a shadow zone according to the position of a front vehicle, if the shadow zone is wider than the front vehicle, the control unit 400 may optimize the shadow zone by removing unnecessary portions of the shadow zone.

Figure 10:
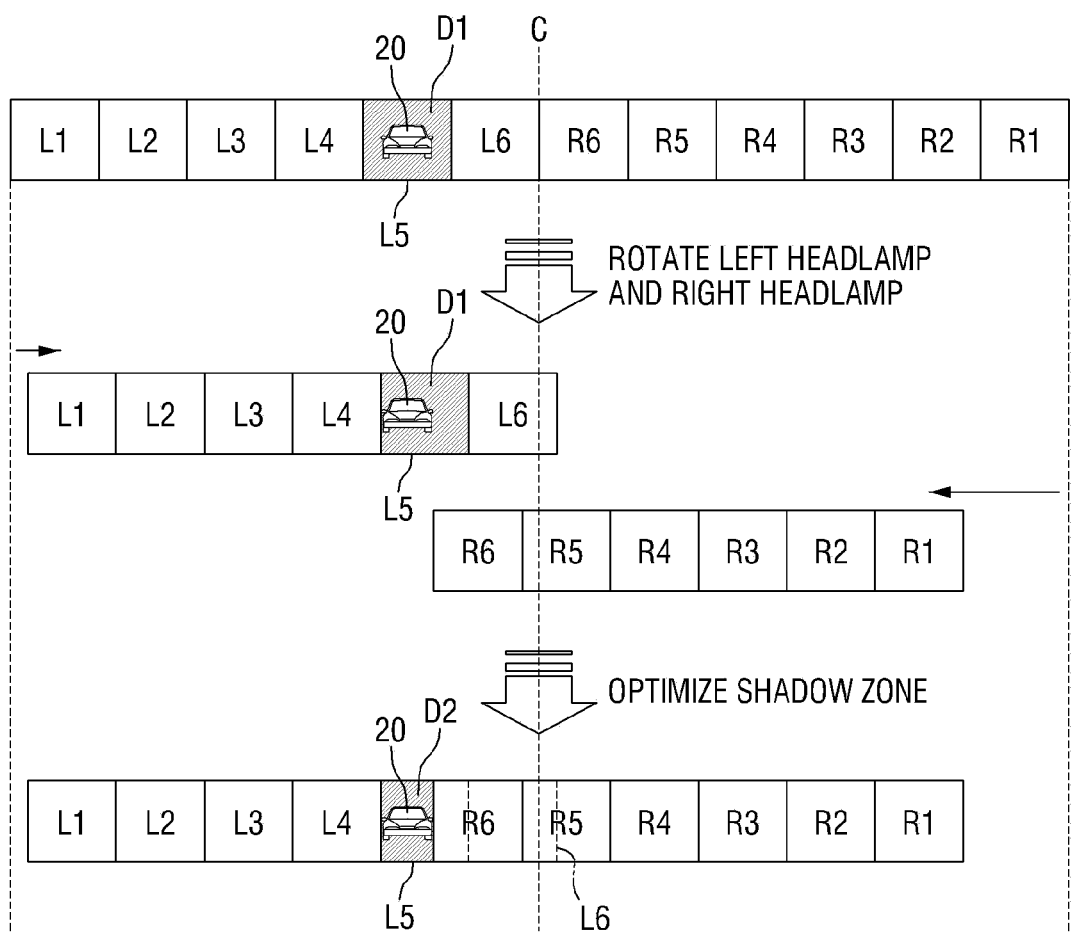
FIG. 10 is a schematic diagram illustrating a process of optimizing a shadow zone according to an exemplary embodiment of the present invention.

For example, a shadow zone D1 may be formed as shown in FIG. 10 by turning off the light source L5 of the left headlamp 310 based on the position of a front vehicle 20. In this case, if the shadow zone D1 is wider than the front vehicle 20, left and right ends of the shadow zone D1 may be adjusted respectively to left and right sides of the front vehicle 20 by rotating one or more of the left headlamp 310 and the right headlamp 320 in an inward direction of the vehicle 10. Since one or more of the left headlamp 310 and the right headlamp 320 are rotated in the inward direction of the vehicle 10, an optimum shadow zone D2 with a reduced width may be formed.

Figure 11:
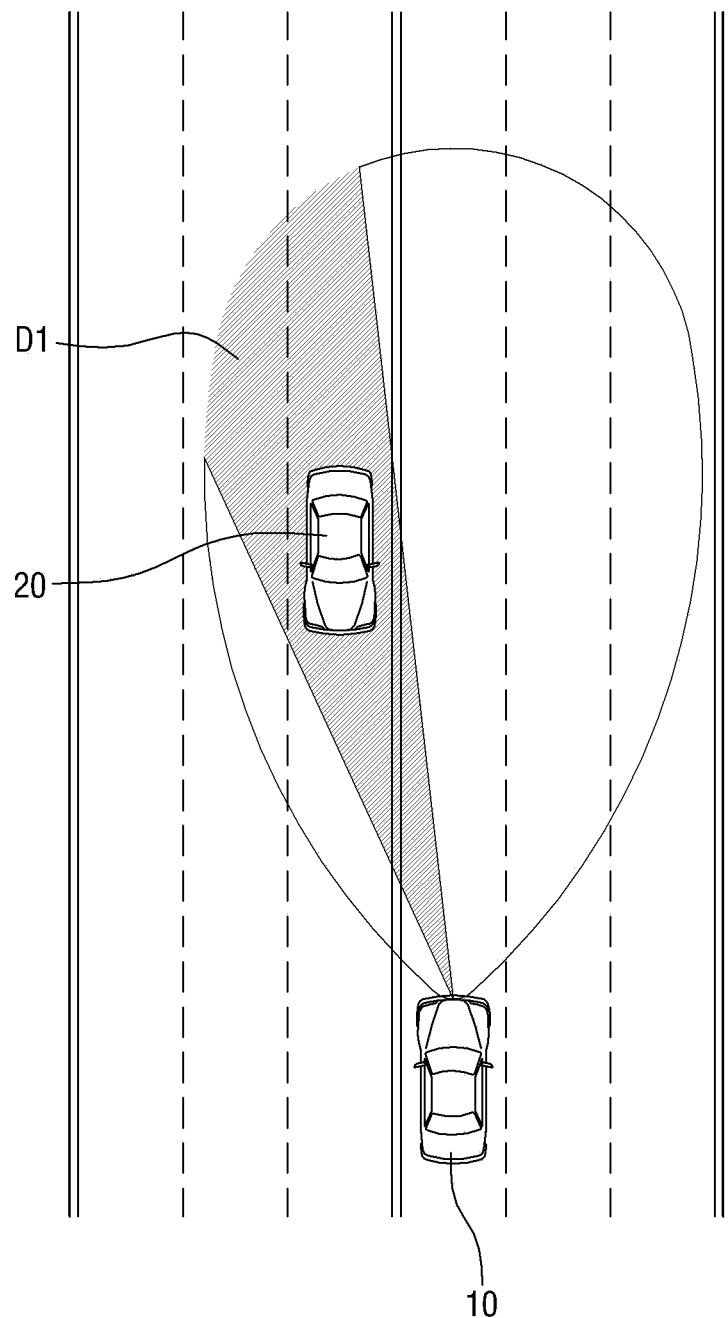
FIG. 11 is a schematic diagram of a shadow zone before being optimized according to an exemplary embodiment of the present invention.
Figure 12:
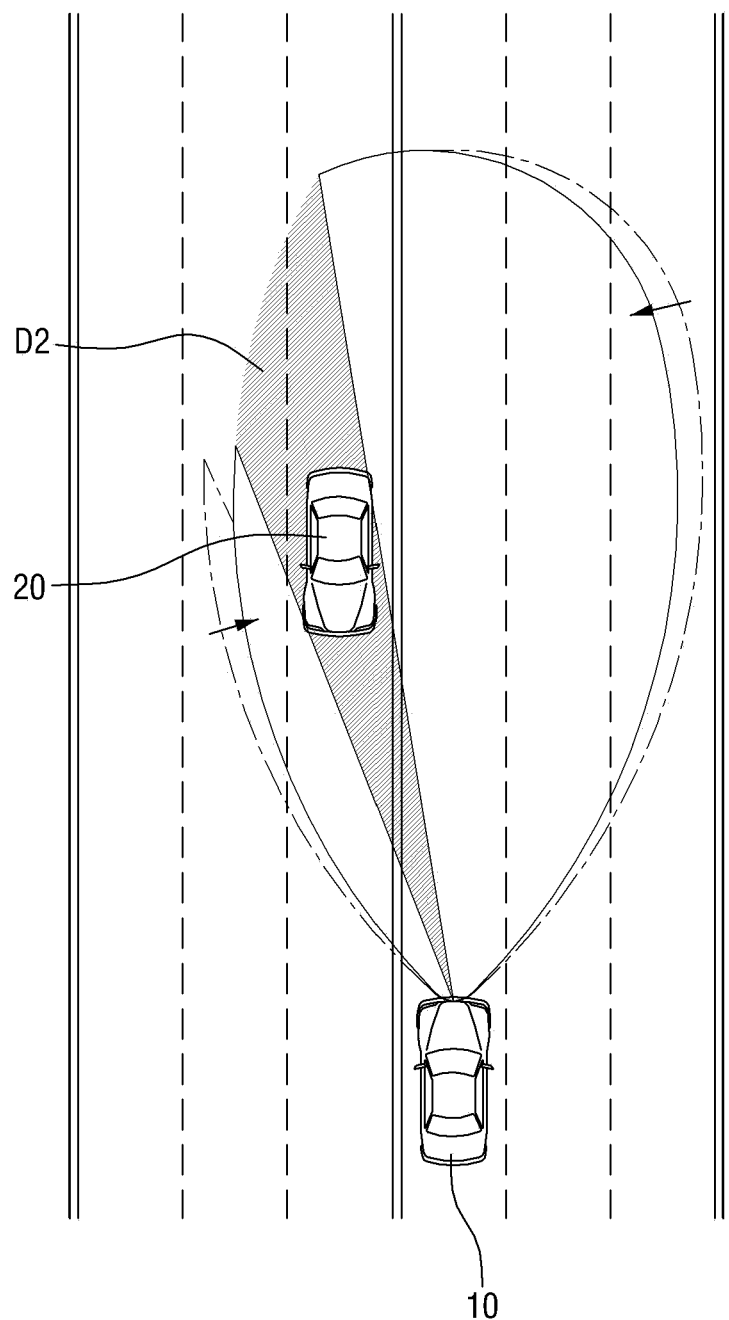
FIG. 12 is a schematic diagram of a shadow zone after being optimized according to an exemplary embodiment of the present invention.

The optimization of a shadow zone described above with reference to FIG. 10 can be described using an illumination pattern as shown in FIGS. 11 and 12.

Referring to FIG. 11, when a front vehicle 20 is located outside a predetermined angle Φ with respect to the centerline C of the vehicle 10, for example, when the front vehicle 20 is located at a position corresponding to the light source L5 of the left headlamp 310, the control unit 400 may form a shadow zone D1 by reducing the light intensity of the light source L5 or turning off the light source L5.

In FIG. 11, the shadow zone D1 is wider than the front vehicle 20. In this case, left and right ends of the shadow zone D1 may be adjusted to left and right sides of the front vehicle 20 by rotating the left headlamp 310 and the right headlamp 320 in the inward direction of the vehicle 10 as indicated by arrows in FIG. 12. Accordingly, unnecessary portions of the shadow zone D1 are removed, thereby forming an optimum shadow zone D2.

In FIGS. 10 through 12, a case where there is only one front vehicle and where the front vehicle is an oncoming vehicle is described as an example. However, this is merely an example used to help understand the present invention, and the present invention is not limited to this example. When there are multiple front vehicles (e.g., oncoming vehicles and preceding vehicles), a shadow zone may be formed by adjusting light intensity based on rightmost and leftmost front vehicles. Then, the left headlamp 310 and the right headlamp 320 may be rotated such that a left end and a right end of the shadow zone are adjusted to the leftmost front vehicle and the rightmost front vehicle, respectively.

For example, when light sources corresponding to multiple front vehicles are L5, R6 and R4, a shadow zone may be formed by adjusting light intensities of the light sources L5, L6, R6, R5 and R4. Then, a left end of the shadow zone may be adjusted to a front vehicle corresponding to the light source L5 by rotating the left headlamp 310, and a right end of the shadow zone may be adjusted to a front vehicle corresponding to the light source R4 by rotating the right headlamp 320. In this way, the shadow zone can be optimized.

In the illustrative embodiment, after a shadow zone is formed by adjusting the light intensity of a light source, it is optimized by rotating one or more of the left headlamp 310 and the right headlamp 320. However, this is merely an example used to help understand the present invention. The present invention can also be applied similarly to a case where a shadow zone is formed by rotating the headlamp unit 300 since a front vehicle exists within a predetermined angular range with respect to the centerline C of the vehicle 10. For example, a shadow zone may be formed by rotating the headlamp unit 300 and then optimized by comparing a width of the shadow zone and a width of the front vehicle.

When a front vehicle 20 exists within a predetermined angular range Φ with respect to the centerline C of the vehicle 10 or when one or more of the left headlamp 310 and the right headlamp 320 are rotated in the inward direction of the vehicle 10 to form an optimum shadow zone, a shadow zone may be formed in the illumination patterns of the left headlamp 310 and the right headlamp 320 in an outward direction of the vehicle 10. To compensate for the shadow zone, the light intensity of a leftmost light source of the left headlamp 310 and the light intensity of a rightmost light source of the right headlamp 320 may be increased, or auxiliary lamps may be installed. Accordingly, the visibility of the driver can be ensured.

Figure 13:
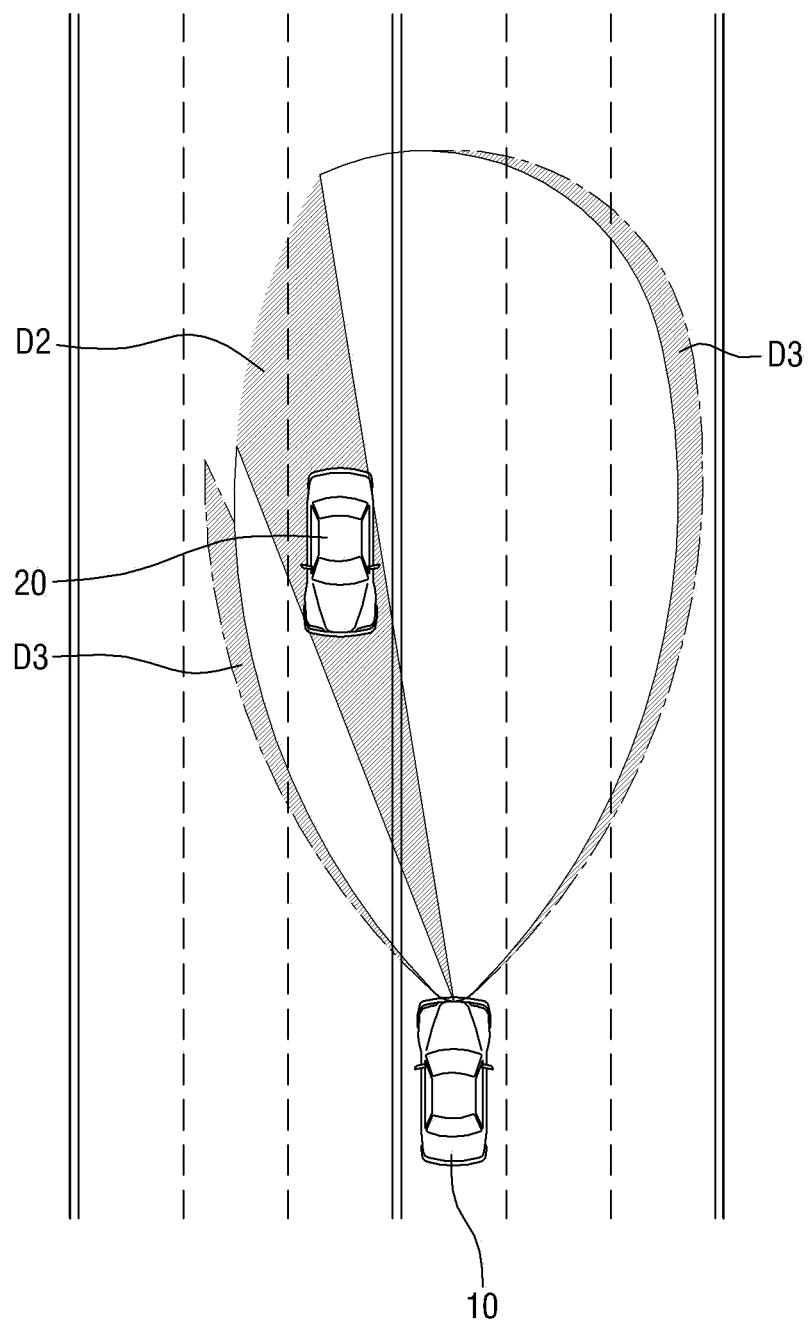
FIG. 13 is a schematic diagram of a shadow zone compensated for according to an exemplary embodiment of the present invention.

FIG. 13 is a schematic diagram of a shadow zone compensated for according to an embodiment of the present invention. In FIG. 13, a case where the left headlamp 310 and the right headlamp 320 are rotated in the inward direction of the vehicle 10 to form an optimum shadow zone D2 as shown in FIG. 12 is illustrated as an example.

Referring to FIG. 13, a shadow zone D1 may be formed by adjusting the light intensity of a light source corresponding to the position of a front vehicle 20, and then an optimum shadow zone D2 may be formed by rotating the left headlamp 310 and the right headlamp 320 in the inward direction of the vehicle 10. In this case, a shadow zone D3 that does not contribute to the visibility of the front vehicle 20 may be formed in an outward direction of the vehicle 10. The shadow zone D3 that does not contribute to the visibility of the front vehicle 20 may instead reduce the visibility of the driver of the vehicle 10. Therefore, the shadow zone D3 may be compensated for by increasing the light intensities of the leftmost and rightmost light sources of the left headlamp 310 and the right headlamp 320 or installing auxiliary light sources.

In FIG. 13, a case where the shadow zone D3 is compensated for to form an optimum shadow zone as shown in FIG. 12 by increasing the light intensities of light sources located at outermost positions of the vehicle 10 or using auxiliary light sources is described as an example. However, the present invention is not limited to this example. When a shadow zone that does not contribute to the visibility of the front vehicle 20 is created by the rotation of one or more of the left headlamp 310 and the right headlamp 320, light intensities may be increased, or auxiliary light sources can be driven to compensate for this shadow zone.

Figure 14:
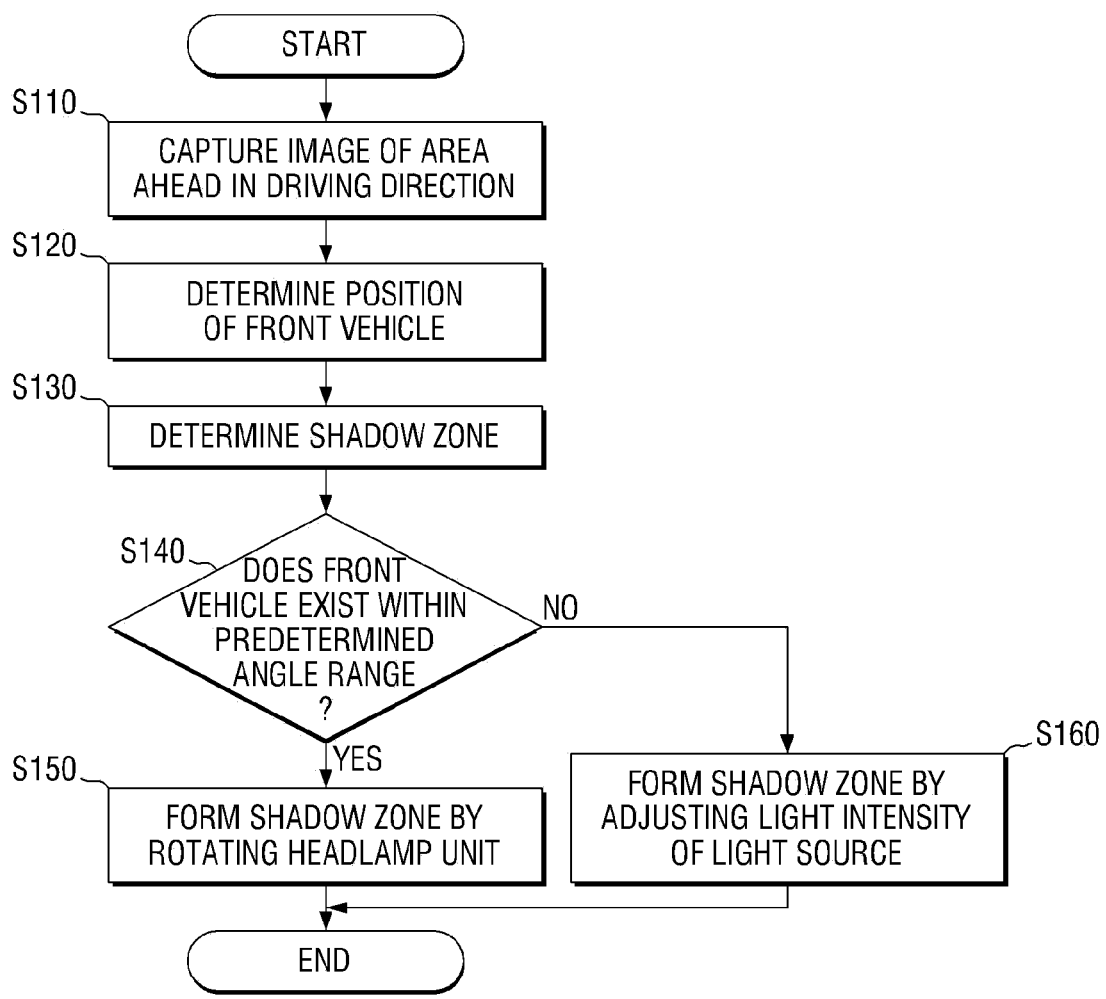
FIG. 14 is a flowchart illustrating a method of controlling an automotive headlamp system according to an exemplary embodiment of the present invention.

FIG. 14 is a flowchart illustrating a method of controlling an automotive headlamp system according to an embodiment of the present invention.

Referring to FIG. 14, in the method of controlling an automotive headlamp system according to the illustrative embodiment, an image capture unit 100 captures an image of an area ahead of a vehicle 10 in a driving direction of the vehicle 10 (operation S110), and a position determination unit 200 determines the position of a front vehicle (e.g., an oncoming vehicle or a preceding vehicle) based on the captured image (operation 120).

A control unit 400 determines a shadow zone based on the determined position of the front vehicle (operation S130). Then, the control unit 400 decides whether to form the shadow zone by rotating a headlamp unit 300 or adjusting the light intensity of a light source. To this end, the control unit 400 determines whether the front vehicle exists within a predetermined angular range with respect to a centerline of the vehicle 10 (operation S140).

When the front vehicle exists within the predetermined angular range with respect to the centerline of the vehicle 10, the control unit 400 forms the shadow zone by rotating the headlamp unit 300 (operation S150).

When the front vehicle exists outside the predetermined angular range with respect to the centerline of the vehicle 10, the control unit 400 forms the shadow zone by adjusting the light intensity of a light source corresponding to the position of the front vehicle (operation S160).

Figure 15:
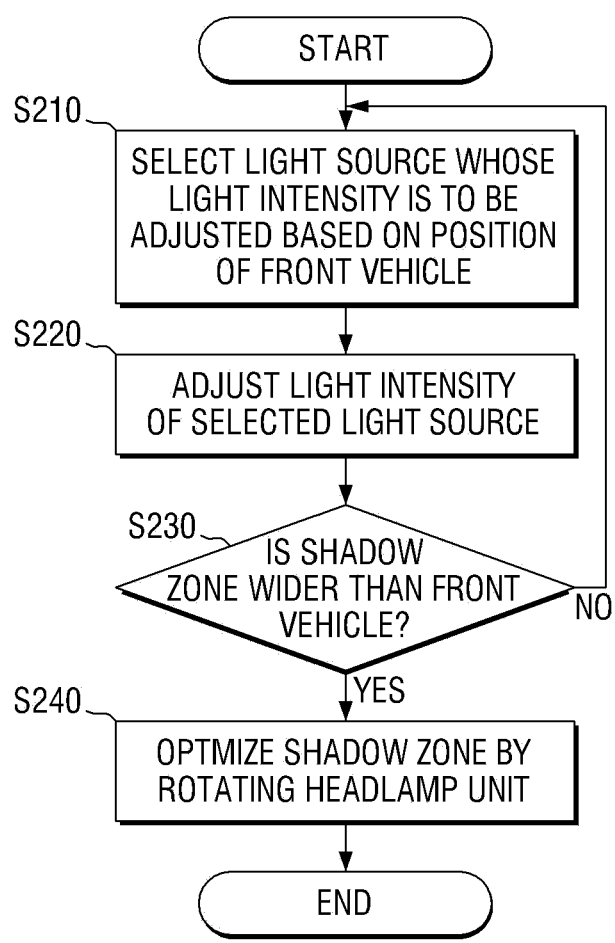
FIG. 15 is a flowchart illustrating a method of optimizing a shadow zone according to an exemplary embodiment of the present invention.

FIG. 15 is a flowchart illustrating a method of optimizing a shadow zone according to an embodiment of the present invention. In FIG. 15, a case where a shadow zone is formed by adjusting light intensity will be described as an example.

Referring to FIG. 15, in the method of optimizing a shadow zone according to the illustrative embodiment, a light source whose light intensity is to be adjusted is selected based on the position of a front vehicle (operation S210). That is, when there is only one front vehicle, a light source corresponding to the front vehicle is selected. When there are multiple front vehicles, light sources whose light intensities are to be adjusted are selected based on a leftmost front vehicle and a rightmost front vehicle.

When the light source whose light intensity is to be adjusted is selected, a shadow zone is formed by reducing the light intensity of the selected light source or turning off the selected light source (operation S220).

When it is determined that the shadow zone is wider than the front vehicle (operation S230), the control unit 400 adjusts a left end and a right end of the shadow zone respectively to a left side and a right side of the front vehicle by rotating any one of a left headlamp 310 and a right headlamp 320 (operation S230).

If the front vehicle is wider than the shadow zone, it indicates that the forming of the shadow zone has not been performed normally. Therefore, the selecting of the light source whose light intensity is to be adjusted and then the optimizing the shadow zone may be performed repeatedly.

Figure 16:
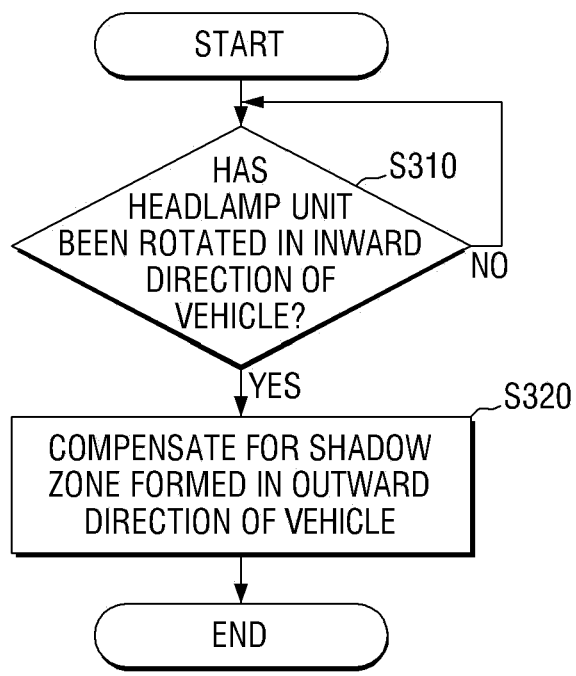
FIG. 16 is a flowchart illustrating a method of compensating for a shadow zone according to an exemplary embodiment of the present invention.

FIG. 16 is a flowchart illustrating a method of compensating for a shadow zone according to an embodiment of the present invention.

Referring to FIG. 16, in the method of compensating for a shadow zone according to the illustrative embodiment, it is determined whether the headlamp unit 300 has been rotated in an inward direction of the vehicle 10 to form a shadow zone or optimize the shadow zone (operation S310).

If the headlamp unit 310 has been rotated in the inward direction of the vehicle 10, a shadow zone formed in an outward direction of the vehicle 10 is compensated for by increasing light intensities of light sources located at outermost positions of the vehicle 10 or driving auxiliary light sources (operation S320).

An automotive headlamp system and a method of controlling the same according to the present invention provide at least one of the following advantages.

First, an illumination pattern is controlled not only by rotating a headlamp unit which includes a plurality of light sources but also by adjusting the light intensity of a light source based on the position of a front vehicle located ahead of a vehicle in a driving direction. Therefore, the number of light sources required can be reduced, thereby saving costs.

In addition, when the illumination pattern is controlled by adjusting the light intensity of a light source, an optimum illumination pattern can be formed by rotating the headlamp unit. Accordingly, this can secure maximum visibility for the driver of the vehicle and while at the same time ensuring the visibility of the front vehicle located ahead of the vehicle in the driving direction.

Furthermore, since a shadow zone, which is formed by the rotation of the headlamp unit based on the position of the front vehicle and does not contribute to the visibility of the front vehicle, can be compensated for by the control unit described herein, maximum visibility can be ensured for the driver of the vehicle.

However, the effects of the present invention are not restricted to the one set forth herein. The above and other effects of the present invention will become more apparent to one of daily skill in the art to which the present invention pertains by referencing the claims.

Furthermore, although the above exemplary embodiment is described as using a plurality of units to perform the above process, it is understood that the above processes may also be performed by a single unit configured to execute each of the above described processes.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. The scope of the present invention is defined by the following claims, rather than by the above-described detailed description. The meanings and scope of the claims, and all modifications or modified shapes, which are derived from equivalent concepts thereof, should be understood as being included in the scope of the present invention.

What is claimed is:

1. An automotive headlamp system comprising:
an image capture unit configured to capture an image of an area ahead of a vehicle in a driving direction of the vehicle;
a position determination unit configured to determine a position of a front vehicle based on the captured image;
a headlamp unit comprising an array of a plurality of light sources; and
a control unit configured to perform one of rotation of the headlamp unit or adjustment of a light intensity of a light source if the position of the front vehicle is determined to be within a predetermined angular range with respect to a centerline of the vehicle and perform the other of rotation of the headlamp unit or adjustment of the light intensity of the light source if the position of the front vehicle is determined to be outside the predetermined angular range with respect to the centerline of the vehicle.

2. The automotive headlamp system of claim 1, wherein the control unit forms a shadow zone by rotating the headlamp unit and/or adjusting the light intensity of the light source based on the determined position of the front vehicle and, when the shadow zone is wider than the front vehicle, adjusts left and right ends of the shadow zone respectively to left and right sides of the front vehicle by rotating the headlamp unit.

3. The automotive headlamp system of claim 2, wherein when there are multiple front vehicles, the control unit determines a distance between a leftmost front vehicle and a rightmost front vehicle as a width of the front vehicles.

4. The automotive headlamp system of claim 1, wherein the headlamp unit comprises a first headlamp and a second headlamp.

5. The automotive headlamp system of claim 4, wherein when the front vehicle exists within the predetermined angular range with respect to the centerline of the vehicle, the control unit forms a shadow zone by rotating one or more of the first headlamp and the second headlamp.

6. The automotive headlamp system of claim 4, wherein when the front vehicle exists outside the predetermined angular range with respect to the centerline of the vehicle, the control unit forms a shadow zone by adjusting light intensities of one or more of a plurality of light sources included in one or more of the first headlamp and the second headlamp.

7. The automotive headlamp system of claim 6, wherein when the shadow zone formed by the adjusting of the light intensities is wider than the front vehicle, the control unit adjusts left and right ends of the shadow zone respectively to the left and right sides of the front vehicle by rotating one or more of the first headlamp and the second headlamp.

8. The automotive headlamp system of claim 7, wherein when there are multiple front vehicles, the control unit determines a distance between a leftmost front vehicle and a rightmost front vehicle as a width of the front vehicles.

9. The automotive headlamp system of claim 1, wherein the light sources are light-emitting diodes (LEDs).

10. The automotive headlamp system of claim 1, wherein when the headlamp unit rotates in an inward direction of the vehicle, the control unit increases light intensities of light sources located at outermost positions of the vehicle.

11. The automotive headlamp system of claim 1, further comprising auxiliary light sources installed at the outermost positions of the vehicle and driven when the headlamp unit rotates in the inward direction of the vehicle.

12. A method of controlling an automotive headlamp system, the method comprising:
- capturing, by an image capture unit, an image of an area ahead of a vehicle in a driving direction of the vehicle;
- determining, by a position determination unit, a position of a front vehicle based on the captured image; and
- preforming one of rotating, by a control unit, a headlamp unit which comprises an array of a plurality of light sources or adjusting, by the control unit, a light intensity of a light source if the position of the front vehicle is determined to be within a predetermined angular range with respect to a centerline of the vehicle; and
- preforming the other of rotating, by the control unit, the headlamp unit which comprises the array of the plurality of light sources or adjusting, by the control unit, the light intensity of the light source if the position of the front vehicle is determined to be outside the predetermined angular range with respect to the centerline of the vehicle to control an illumination pattern of the headlamp unit.

13. The method of claim 12, wherein the controlling of the illumination pattern comprises:
- forming a shadow zone by rotating the headlamp unit and/or adjusting the light intensity of the light source based on the determined position of the front vehicle; and
- adjusting left and right ends of the shadow zone respectively to left and right sides of the front vehicle by rotating the headlamp unit when the shadow zone is wider than the front vehicle.

14. The method of claim 13, wherein the controlling of the illumination pattern comprises, when there are multiple front vehicles, determining a distance between a leftmost front vehicle and a rightmost front vehicle as a width of the front vehicles.

15. The method of claim 12, wherein the headlamp unit comprises a first headlamp and a second headlamp.

16. The method of claim 15, wherein the controlling of the illumination pattern comprises:
- forming a shadow zone by rotating one or more of the first headlamp and the second headlamp when the front vehicle exists within the predetermined angular range with respect to the centerline of the vehicle; and
- forming the shadow zone by adjusting a light intensity of a light source corresponding to the determined position of the front vehicle when the front vehicle exists outside the predetermined angular range with respect to the centerline of the vehicle.

17. The method of claim 16, wherein the controlling of the illumination pattern comprises adjusting left and right ends of the shadow zone respectively to the left and right sides of the front vehicle by rotating one or more of the first headlamp and the second headlamp when the shadow zone is wider than the front vehicle.

18. The method of claim 17, wherein the controlling of the illumination pattern comprises, when there are multiple front vehicles, determining a distance between a leftmost front vehicle and a rightmost front vehicle as a width of the front vehicles.

19. The method of claim 12, further comprising compensating for a shadow zone formed in an outward direction of the vehicle by rotation of the headlamp unit in an inward direction of the vehicle.

20. A non-transitory computer readable medium containing program instructions executed by a processor or controller, the computer readable medium comprising:
- program instructions that receive an image of an area ahead of a vehicle in a driving direction of the vehicle captured by an image capture unit;
- program instructions that determine a position of a front vehicle based on the captured image; and
- program instructions that preform one of rotation of a headlamp unit, which comprises an array of a plurality of light sources or adjustment of a light intensity of a light source, if the position of the front vehicle is determined to be within a predetermined angular range with respect to a centerline of the vehicle and preform the other of rotation of the headlamp unit, which comprises the array of the plurality of light sources or adjustment of the light intensity of the light source, if the position of the front vehicle is determined to be outside the predetermined angular range with respect to the centerline of the vehicle to control an illumination pattern of the headlamp unit.

21. The non-transitory computer readable medium of claim 20, wherein the program instructions that control of the illumination pattern comprises:
- program instructions that form a shadow zone by rotating the headlamp unit and/or adjusting the light intensity of the light source based on the determined position of the front vehicle; and
- program instructions that adjust left and right ends of the shadow zone respectively to left and right sides of the front vehicle by rotating the headlamp unit when the shadow zone is wider than the front vehicle.

* * * * *